United States Patent [19]
Fujinami et al.

[11] Patent Number: 5,419,641
[45] Date of Patent: May 30, 1995

[54] RADIAL NEEDLE BEARING

[75] Inventors: Makoto Fujinami, Chiba; Katsuhiro Ikezawa, Kanagawa; Moichi Chiba, Kanagawa; Hiroshi Iwasa, Kanagawa, all of Japan

[73] Assignee: NSK Ltd., Tokyo, Japan

[21] Appl. No.: 194,578

[22] Filed: Feb. 10, 1994

[30] Foreign Application Priority Data

Feb. 10, 1993 [JP] Japan ................ 5-008937 U

[51] Int. Cl.⁶ .................... F16C 33/78; F16C 33/66
[52] U.S. Cl. ........................... 384/470; 384/484
[58] Field of Search ............... 384/462, 470, 473, 477, 384/484, 486, 488, 569, 572

[56] References Cited

U.S. PATENT DOCUMENTS

| | | | |
|---|---|---|---|
| 3,447,848 | 6/1969 | Pitner | 384/484 |
| 3,479,100 | 11/1969 | Pitner | 384/484 |
| 3,957,278 | 5/1976 | Rabe | 384/484 X |
| 4,323,289 | 4/1982 | Suzuki | 384/470 X |
| 4,353,605 | 10/1982 | Chiba et al. | 384/470 X |
| 4,653,936 | 3/1987 | Olschewski et al. | 384/484 |
| 4,874,260 | 10/1989 | Podhajecki | 384/470 |

FOREIGN PATENT DOCUMENTS 183920 6/1989 Japan.
4121570 10/1992 Japan.

Primary Examiner—Thomas R. Hannon
Attorney, Agent, or Firm—Sughrue, Mion, Zinn, Macpeak & Seas

[57] ABSTRACT

A radial needle bearing includes an outer ring having a race track formed on the inner surface thereof and inward flanges at both ends thereof, a retainer with a plural number of pockets, rotatably located within the outer ring, a seal ring located between the end face of the retainer and inside the inward flange, the seal ring functioning to impede the flow of a lubricating oil flowing in the axial direction within the outer ring, and a plural number of needles rotatably held within each of the pockets. The radial needle bearing is improved in that the outer diameter of the retainer is slightly smaller than the diameter of the race track, and the inner diameter of the retainer is slightly larger than the inscribed circle of the plural number of needles.

11 Claims, 5 Drawing Sheets

RADIAL NEEDLE BEARING

BACKGROUND OF THE INVENTION

1. Field of the Invention

The present invention relates to a radial needle bearing of the type which is assembled into an automatic transmission for motive power machines or various types of oil pressure equipment, and functions to support a rotary shaft within a fixed part of a housing, for example, and to control the quantity of a lubricating oil flowing through a bearing portion.

2. Discussion of the Prior Art

The support bearing provided in an oil pump portion of an automatic transmission for motive power machines, e.g., motor vehicles, requires two functions; one to rotatably support the shaft, and the other to control the quantity of a high pressure oil flowing through the support bearing to restrict the oil flowing toward the low part of the oil flow. To this end, a conventional technique constructs the support bearing such that a sliding bearing 3 is provided between the inner surface of a housing 1 and the outer circumferential surface of a shaft 2, as shown in FIG. 14.

The sliding bearing 3 causes a large torque loss when the shaft 2 rotates. The objective of improving the power performance of motive power machines and reducing fuel consumption causes a designer to use a needle bearing in lieu of the sliding bearing, for the support bearing. An excessive quantity of the oil flowing in the shaft extending direction in a general needle bearing hinders the attempt of applying the needle bearing to the support bearing in the present stage of technology in the related field.

In the above circumstances, Japanese Utility Model Laid-Open Publication No. Hei. 1-83920 proposes the needle bearings with the structures as shown in FIGS. 15 and 16. In the first structure of FIG. 15, a seal ring 4, called a floating seal, is provided between the inner surface of an outer ring 5 forming the needle bearing and the outer surface of a shaft 2. The seal ring 4, shaped like a ring as a whole, is made of synthetic resin. The inner diameter of the seal ring 4 is slightly larger than the outer diameter of the shaft 2. The outer diameter of the seal ring 4 is smaller than the inner diameter of the outer ring 5 but larger than the inner diameter of the inward flange 8a. The seal ring 4 is mounted between a retainer 7 holding a needle 6 and an inward flange 8a located downstream in the flow direction of a lubricating oil, inside the outer ring 5.

In a state that the automatic transmission is operating, an oil pressure presses the seal ring 4 thus mounted against the inner side of the inward flange 8a. In this state, a gap 9 is created between the inner edge of the seal ring 4 and the outer circumferential surface of the shaft 2. The oil flows through the gap 9 downstream.

In the second structure of the needle bearing shown in FIG. 16, a seal ring 4a for controlling the flow rate of lubricating oil is shaped like a ring as a whole and like U in cross section. The inner diameter of the seal ring 4a is slightly larger than the outer diameter of the shaft 2. The outer diameter of the seal ring 4a is smaller than the inner diameter of the outer ring 5 but larger than the inner diameter of the inward flange 8a. Inside the outer ring 5, the seal ring 4a is mounted at a location between the needle 6 and the inward flange 8a located downstream in a state that the U-shaped seal ring 4a is opened toward the opposite side of the needle 6.

The conventional radial needle bearings having the above-mentioned structures have still problems to be solved. The problems are follows.

The radial needle bearing with the first structure shown in FIG. 15 can unsatisfactorily restrict the flow of the lubricating oil because it is very difficult to decrease the width of the gap 9 or to increase the length of the gap. The radial needle bearing with the second structure shown in FIG. 16 may restrict the flow of the lubricating oil because the length of the gap 9a between the inner surface of the seal ring 4a and the outer surface of the shaft 2 can be increased to some extent. However, to secure a satisfactory restriction of the oil flow, the seal ring 4a must be considerably elongated. A limited space for receiving the support bearing in the oil pump portion does not allow excessive elongation of the seal ring 4a.

SUMMARY OF THE INVENTION

The present invention has been made in view of the above circumstances and has an object to provide a radial needle bearing which can satisfactorily reduce the quantity of the lubricating oil without increasing the size of the bearing in the axial direction.

In summary, a radial needle bearing of the present invention, like the conventional one, includes an outer ring having a race track formed on the inner surface thereof and inward flanges at both ends thereof, a retainer with a plural number of pockets, rotatably located within the outer ring, a seal ring located between the end face of the retainer and inside the inward flange, the seal ring functioning to impede the flow of a lubricating oil flowing in the axial direction within the outer ring, and a plural number of needles rotatably held within each of the pockets.

The radial needle bearing may be constructed in such a manner that the outer diameter of the retainer is slightly smaller than the diameter of the race track, and the inner diameter of the retainer is slightly larger than the inscribed circle of the plural number of needles.

The flow of the lubricating oil flowing in the axial direction through the radial needle bearing is restricted by the retainer and the seal ring as well. As a result of a labyrinth effect, satisfactory restriction of the oil flow is secured in the whole radial needle bearing. Therefore, the radial needle bearing can satisfactorily reduce the quantity of the lubricating oil without increasing the size of the bearing in the axial direction.

Other objects, advantages, and features of the present invention will be apparent when carefully reading the following description in connection with the accompanying drawings, in which:

DETAILED DESCRIPTION OF THE PREFERRED EMBODIMENTS

Figure 1:
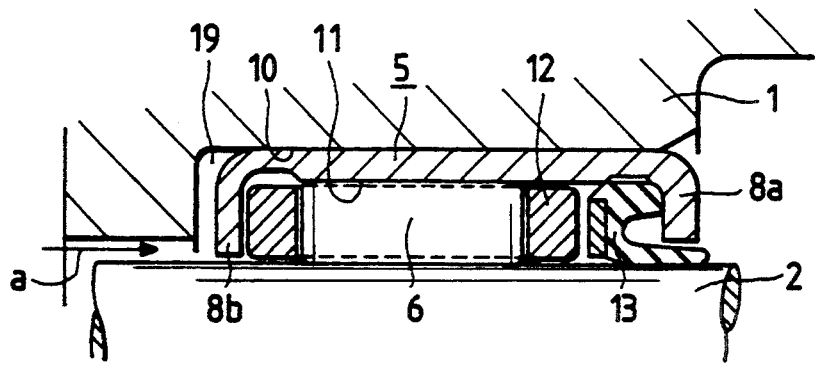
FIG. 1 is a partial sectional view showing a radial needle bearing according to a first embodiment of the present invention.
Figure 2:
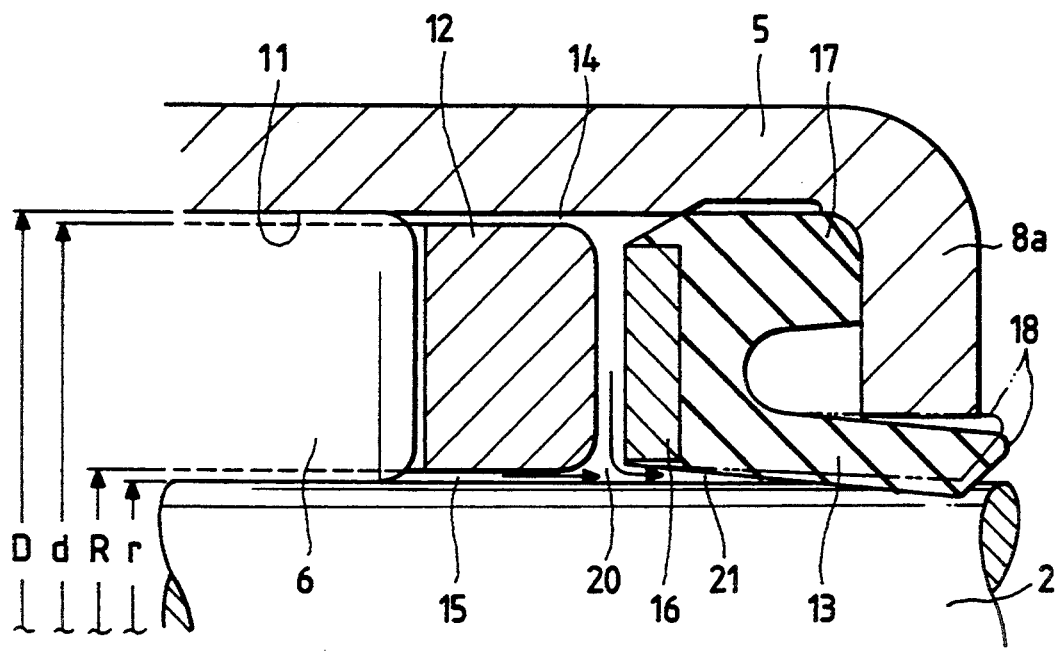
FIG. 2 is an enlarged sectional view showing a key portion of the radial needle bearing of FIG. 1.

FIGS. 1 and 2 show the structure of a radial needle bearing according to a first embodiment of the present invention. A shaft 2 is inserted into a circular hole 10 formed in a housing 1. The shaft 2 rotates relative to the circular hole 10. A tubular outer ring 5 is fastened to the inner surface of the circular hole 10 by an insertion-fitting process. The outer ring 5 includes a race track 11 formed on the inner surface thereof, and inward flanges 8a and 8b located at both the open ends thereof. A retainer 12, a plural number of needles 6 rotatably held by the retainer 12, and a seal ring 13 are provided between the race track 11 and the outer surface of the shaft 2.

The retainer 12, called a squirrel-cage retainer, is made by injection-molding a heat resisting resin or metal such as copper, aluminum or the like. The outer diameter d of the retainer 12 is slightly smaller than the diameter D of the race track 11 (d<D). The inner diameter R of the retainer 12 is slightly larger than the diameter of the inscribed circle of the needles 6, viz., the outer diameter r of the shaft 2 (R>r). In the other words, the thickness of the retainer 12 is slightly smaller than the diameter of the needle 6. Therefore, a minute outer gap 14 is formed between the outer surface of the retainer 12 and the race track 11. A minute inner gap 15 is formed between the inner surface of the retainer 12 and the outer surface of the shaft 2.

The seal ring 13 is formed of a ring-like core bar 16 made of metal and a seal member 17, made of elastic material, e.g., rubber, which is reinforced by the core bar 16. The seal ring 13 is mounted between the outer surface of the retainer 12 and the inner surface of the inward flange 8a located downstream in the oil flow direction (rightward in FIG. 1). A portion of the bottom of the seal member, which is extended under the bottom end of the inward flange 8a and along the shaft 2 (as viewed in the drawing), forms a seal lip 18, shaped like a short tube. Accordingly, the fore end of the seal lip 18 is located under the bottom end of the inward flange 8a. Before the inward flange 8b of relatively thin thickness is bent and formed, the retainer 12 and the seal ring 13 are inserted into the outer ring 5.

In the radial needle bearing thus constructed, oil flows through a space 19 between the inner surface of the circular hole 10 and the outer surface of the shaft 2 in the direction from left to right in FIG. 1. The oil flow is first restricted by the retainer 12. The oil flows in the direction of an arrow a to enter the space 19, and flows through the outer gap 14 and the inner gap 15, which are located outer side and the inner side of the retainer 12, and reaches a gap 20 located downstream of the retainer 12. A pressure of the oil in the gap 20 is lower than a pressure of the oil at a location upstream of the retainer 12, by a value corresponding to the friction created when it passes through the gaps 14 and 15.

The oil reaching the gap 20, as indicated by an alternate long and two short dashes line in FIG. 2, flows in the direction of the current of oil stream, through a gap 21, which defined by the inner surface of the seal lip 18 and the outer surface of the shaft 2, while pushing outwardly in the diameter direction. The outer surface of the fore end of the seal lip 18 faces the inner circumferential edge of the inward flange 8a located downstream. Deformation of the seal lip 18 is limited by the inward flange 8a. Therefore, the cross sectional area of the gap 21 is also limited. A pressure of oil within the gap 20 located upstream of the gap 21 is lower than a pressure of the oil located upstream of the retainer 12. A sort of labyrinth effect acts to weaken the energy of the oil flowing through the gap 21.

As a result, the quantity of the oil flowing from a high part to a lower part of the oil flow in the radial needle bearing is satisfactorily reduced. Thus, the radial needle bearing of the invention can satisfactorily reduce the quantity of the lubricating oil without increasing the size of the bearing in the axial direction.

Figure 3:
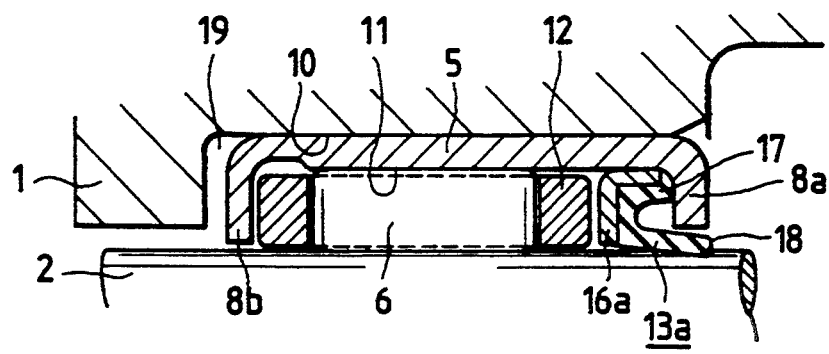
FIG. 3 is a partial cross sectional view showing a radial needle bearing according to a second embodiment of the present invention.

FIG. 3 shows a second embodiment of a radial needle bearing according to the present invention. In this embodiment, a core bar 16a forming a seal ring 13a is shaped like an L in cross section. A part of the core bar 16a is inserted into the outer ring 5, thereby fastening the seal ring 13a to the outer ring 5. The thus shaped core bar 16a improves the rigidity of the seal ring 13a in the radial and thrust directions. As a result, the seal ring 13a can more efficiently restrict the flow of the lubricating oil. The remaining structure and the operation of the radial needle bearing of the second embodiment are substantially the same as of the first embodiment.

Figure 4:
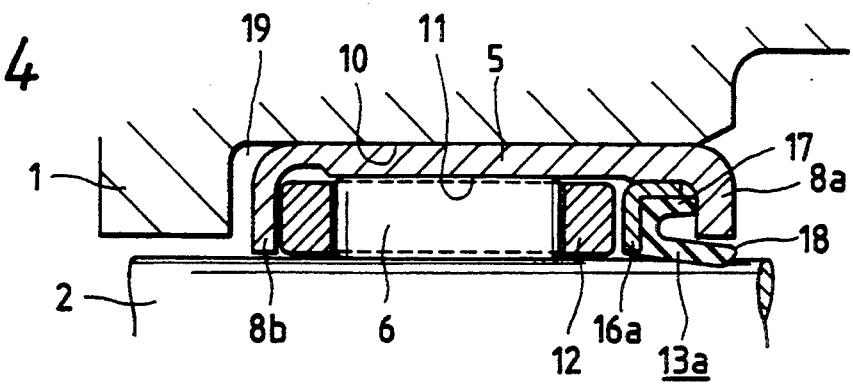
FIG. 4 is a partial cross sectional view showing a radial needle bearing according to a third embodiment of the present invention.

FIG. 4 shows a third embodiment of a radial needle bearing according to the present invention. In this embodiment, the inner diameter of a part of the inner surface of the outer ring 5 where it receives the seal ring 13a is slightly smaller than the inner diameter of the race track 11 of the outer ring 5 where it comes in contact with the needles 6. Accordingly, in this embodiment, the core bar 16a of the seal ring 13a can be inserted and fastened to the outer ring 5 easily and not damaging the race track 11. The remaining structure and the operation of the radial needle bearing of the second embodiment are substantially the same as of the first embodiment.

Figure 5:
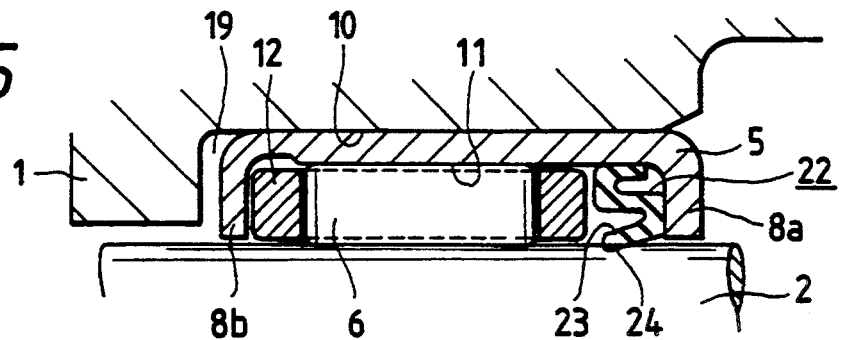
FIG. 5 is a partial cross sectional view showing a fourth embodiment of a radial needle bearing according to the present invention.
Figure 6:
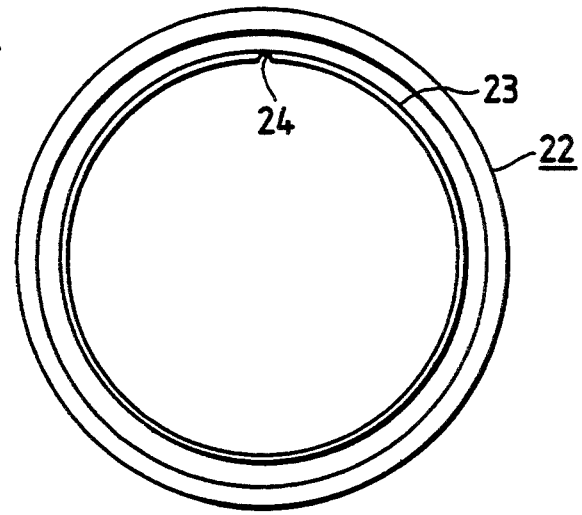
FIG. 6 is a front view showing a seal ring when viewed from the left side in FIG. 5.

FIGS. 5 and 6 show a fourth embodiment of a radial needle bearing according to the present invention. A seal ring, located downstream of the retainer 12, is shaped like S in cross section and made of an elastic material such as rubber. The seal ring is of the so-called "self-seal type". When a pressure is applied to the upstream side of the seal ring 22, the seal lip 23 located on the inner boundary of the seal ring 22 is pressed against the outer surface of the shaft 2. The seal lip 23 has a cutout 24 formed in the inner edge thereof as shown in FIG. 6. When the seal lip 23 is pressed against the outer surface of the shaft 2, the cutout 24 provides only the oil flow path of the seal ring 22. Accordingly, a properly selected size of the cutout 24 will satisfactorily restrict the oil flow in the radial needle bearing.

Figure 7:
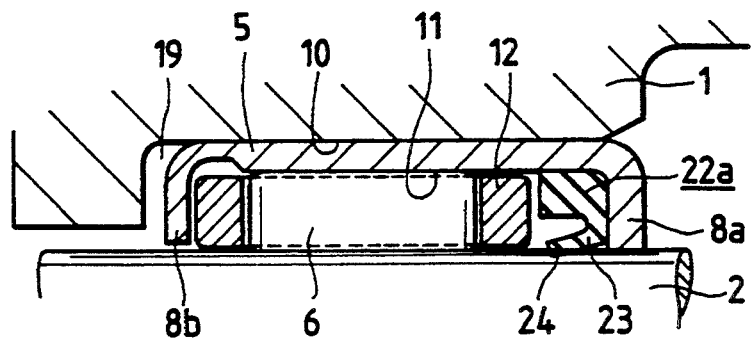
FIG. 7 is a partial cross sectional view showing a fifth embodiment of a radial needle bearing according to the present invention.

FIG. 7 shows a fifth embodiment of a radial needle bearing according to the present invention. In this embodiment, the upper part (as viewed in cross section) of a seal ring 22a is thicker than the lower part. This feature increases the rigidity of the seal ring 22a. The remaining structure and the operation of the radial needle bearing of the second embodiment are substantially the same as of the fourth embodiment.

Figure 8:
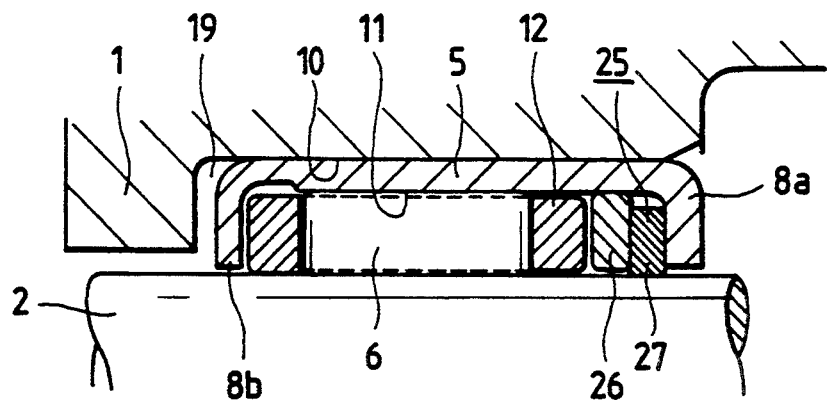
FIG. 8 is a partial cross sectional view showing a sixth embodiment of a radial needle bearing according to the present invention.
Figure 9:
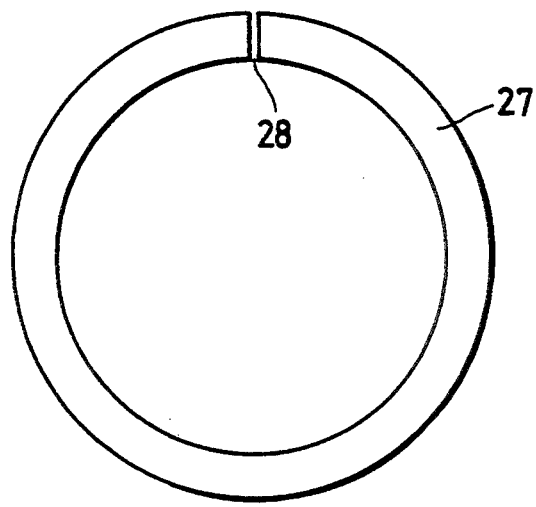
FIG. 9 is a front view showing a ring element with a slit, which is closer to the downstream inward flange.
Figure 10:
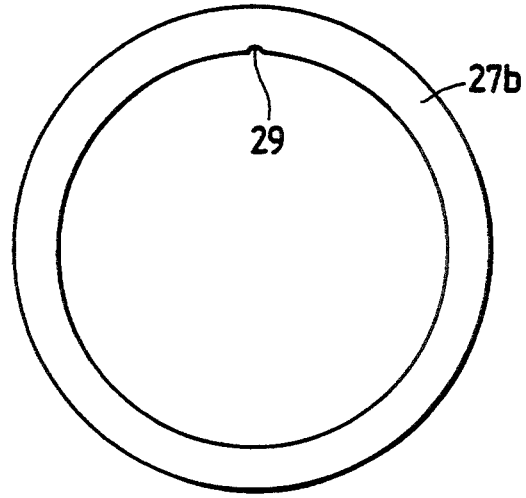
FIG. 10 is a front view showing another ring element with a cutout, which is also located closer to the downstream inward flange.

FIGS. 8 through 10 show a sixth embodiment of a radial needle bearing according to the present invention. In this embodiment, a seal ring 25 located downstream of the retainer 12 consists of a pair of ring elements 26 and 27, placed one upon the other in the thrust direction. Those ring elements 26 and 27 are made of easy-to-slip synthetic resin, such as nylon, Delrin, PTFE (polytetrafluoroethylene).

The ring element 27, located closer to the downstream inward flange 8a, has a slit 28 at a proper location thereof, as shown in FIG. 9. A cutout 29 may be formed in lieu of the slit 28 as shown in FIG. 10. The slit 28 or the cutout 29 forms a restricting path of the oil. The ring element 26 located closer to the retainer 12 is inserted and fastened to the outer ring 5 at a location downstream of the retainer 12 by a insertion-fitting manner. A gap is formed between the ring element 26 and the inward flange 8a. The gap is slightly larger than the thickness of the ring element 27. This gap prevents a strong friction from being created between the ring elements 26 and 27.

In the sixth embodiment, the lubricating oil reaching a location downstream of the retainer 12 is allowed to flow through only the slit 28 of the ring element 27 (in the structure of FIG. 9) or the cutout 29 of the ring element 27 (in the structure of FIG. 10) in the direction of the oil flow. Accordingly, a properly selected size of the slit 28 or the cutout 29 will satisfactorily restrict the oil flow in the radial needle bearing.

Figure 11:
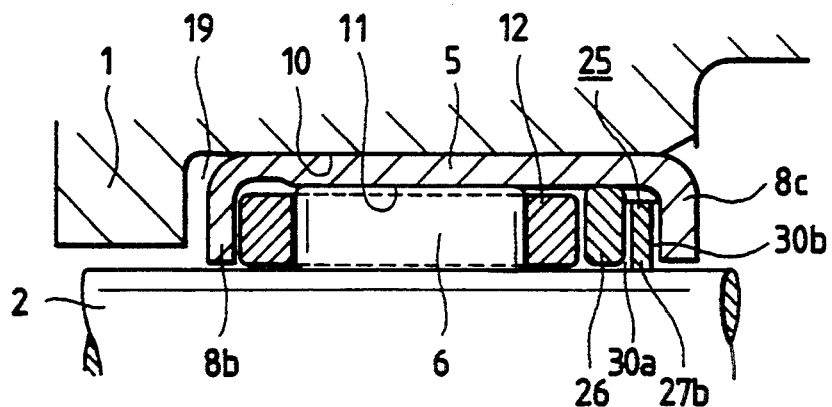
FIG. 11 is a partial cross sectional view showing a seventh embodiment of a radial needle bearing according to the present invention.
Figure 12:
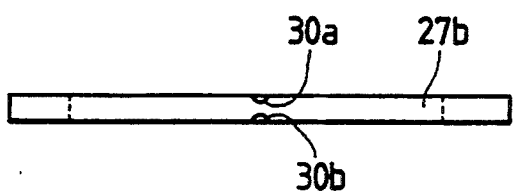
FIG. 12 is a plan view showing of a ring element located closer to an inward flange in the seventh embodiment.
Figure 13:
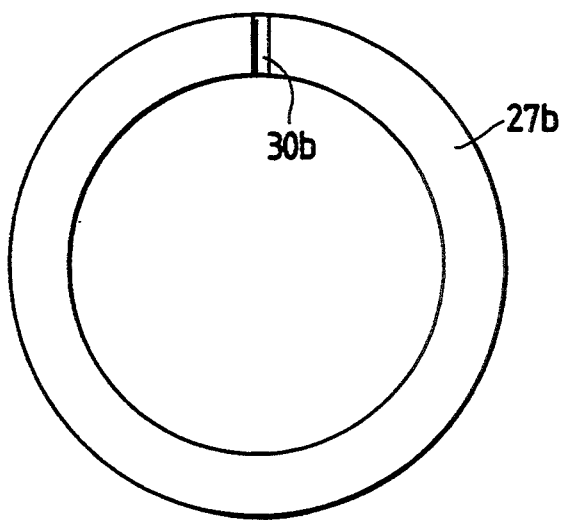
FIG. 13 is a front view showing the ring element of FIG. 12.
Figure 14:
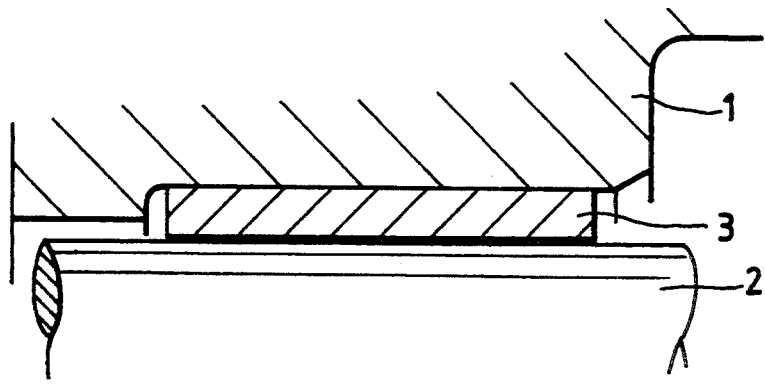
FIG. 14 is a partial cross sectional view showing the structure of a conventional sliding bearing.
Figure 15:
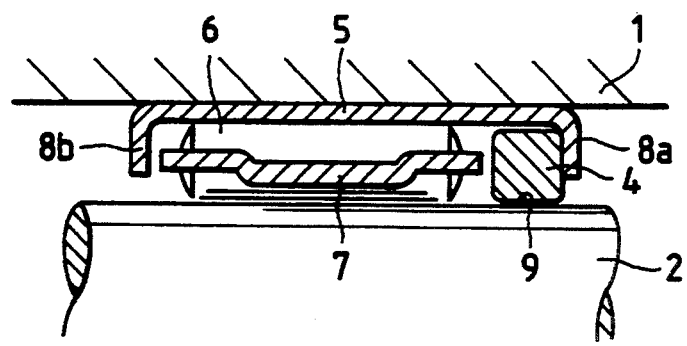
FIG. 15 is a partial cross sectional view showing a first example of the structure of a conventional needle bearing.
Figure 16:
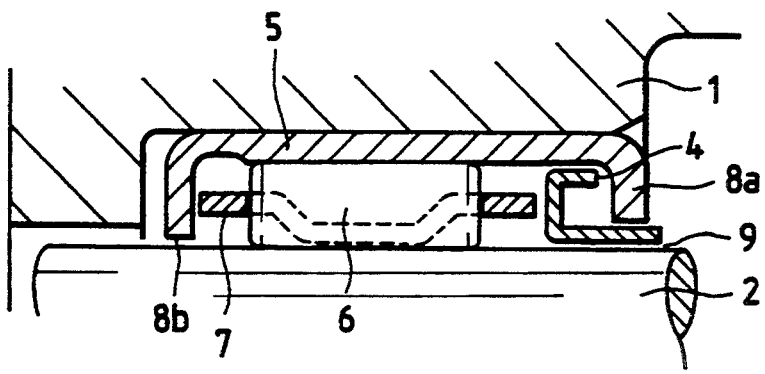
FIG. 16 is a partial cross sectional view showing a second example of the structure of a conventional needle bearing.

FIGS. 11 through 13 show a seventh embodiment of a radial needle bearing according to the present invention. In this embodiment, a seal ring located downstream of the retainer 12 consists of a pair of ring elements 26 and 27b, placed one upon the other in the thrust direction. Those ring elements 26 and 27b are made of easy-to-slip resin, such as nylon. The ring element 27b, located closer to the downstream inward flange 8a, has cutouts 30a and 30b on both sides thereof, as shown in FIGS. 12 and 13. The cutouts 30a and 30b form restricting paths of the oil.

In the seventh embodiment, the lubricating oil reaching a location downstream of the retainer 12 is allowed to flow through only the upstream and downstream cutouts 30a and 30b in the direction of the oil flow. Accordingly, properly selected sizes of the cutout 30a or 30b will satisfactorily restrict the oil flow in the radial needle bearing.

There is a functional difference among the ring elements 27, 27a and 27b shown in FIGS. 9, 10, 13.

As shown in FIG. 9, the inner diameter of the ring element 27 can be adjusted by an elastic deformation of the ring element 27, so that even if the inner diameter of the ring element 27 is not coincided with the outer diameter of the shaft 2 in size, it is possible to prevent the oil from flowing into a space between the inner peripheral surface of the ring element 27 and the outer peripheral surface of the shaft 2 by bringing the inner peripheral surface of the ring element 27 into close contact with the outer peripheral surface of the shaft 2. However, in the case where the inner diameter of the ring element 27 is elastically deformed in view of the oil pressure or the like, there is a possibility that the oil flows into such a space, so that the size of the slit 28 is simultaneously changed and a quantity of the restricted oil is changed. Therefore, this ring element 27 may be not suitable for the use in which the oil pressure is particularly high.

In addition, in the case where the ring 27a shown in FIG. 10 is utilized, it is necessary to strictly control the inner diameter of the ring element 27 and the outer diameter of the shaft 2. On the other hand, it is not necessary to consider a change of the oil quantity in view of the elastic deformation of the ring element 27. Accordingly, this ring element 27a may be preferable for the use in which the oil pressure is high.

Further, in addition to the above-mentioned effect obtained by the use of the ring element 27a, the use of the ring element 27b shown in FIG. 13 has the other effect for easily making an oil restricting effect larger. That is, in order to make the oil restricting effect larger, the cross-sectional area of the cutout 29 of the ring element 27a shown in FIG. 10 must be made smaller. Since the cutout 29 is already very small in size, it is very difficult to form or produce the cutout 29 into a predetermined size smaller in size. On the other hand, in the ring element 27b having the cutouts 30a and 30b shown in FIGS. 12 and 13, even if the cross-sectional area of each the cutouts 30a and 30b is larger as compared with the cutout 29 of the ring element 27a shown in FIG. 10, it is possible to obtain a sufficient oil restricting effect, due to the fact that the length of the oil flowing passage can be made larger as compared with the use of the ring element 27a. In addition, the cross-sectional area of each the cutouts 30a and 30b of the ring element 27b is larger than that of the ring element 27a, so that the oil passage passing the cutout 30a and 30b is not easily clogged by a foreign matter and an oil flowing ability can be maintained. Further, the oil passing within the cutout 30a and 30b is also drawn into a sliding space in a thrust direction between the inner peripheral surface of the ring element 27b and the outer peripheral surface of the shaft 2, so that a sliding ability between these surfaces are improved. Therefore, it is also possible to obtain a reduction effect of the rotation torque loss. In addition, the oil restricting effect can be easily adjusted by changing depths or the number of the cutouts 30a and 30b.

The radial needle bearing of the present invention thus constructed and operated, can satisfactorily restrict the flow of a lubricating oil through a space between the shaft and the outer ring, without increasing the weight of the seal ring and the outer ring. Accordingly, the present invention greatly contributes to the improvement of the machine performances, which result from the reduction of the weight of the automatic transmission and the inertia mass of the automatic transmission.

While several specific embodiments of the present invention have been described, variations thereto will occur to those skilled in the art within the scope of the inventive concepts which are defined by the appended claims.

What is claimed is:

1. A radial needle bearing comprising:
   an outer ring having a race track formed on the inner surface thereof and an inward flange at an end thereof;
   a retainer with a plural number of pockets, said retainer rotatably located within the outer ring;
   a seal ring located between an end face of said retainer and inside the inward flange, said seal ring functioning to impede the flow of a lubricating oil flowing in the axial direction within said outer ring; and
   a plural number of needles rotatably held within each said pocket,
   wherein the outer diameter of said retainer is slightly smaller than the diameter of said race track, and the inner diameter of said retainer is slightly larger than the diameter of an inscribed circle of said plural number of needles.

2. A radial needle bearing according to claim 1, in which said seal ring comprises:
   an annular core bar made of metal; and
   a seal member made of elastic material and reinforced by the core bar,
   wherein said seal ring is mounted between an outer surface of said retainer and an inner surface of said inward flange located downstream in a direction of flow of the lubricating oil flowing in the axial direction.

3. A radial needle bearing according to claim 2, in which said core bar is shaped like L in cross section, and a part of the core bar is inserted into the outer ring so as to fasten said seal ring to said outer ring.

4. A radial needle bearing according to claim 1, in which said seal ring further comprises:
   a seal lip brought in close contact with an outer periphery of a shaft which is supported by said radial needle bearing, said seal lip integrally formed on a bottom portion of the seal member which is extended under a bottom end of said inward flange and along said shaft.

5. A radial needle bearing according to claim 1, in which the inner diameter of a part of the inner surface of said outer ring where it receives said seal ring is slightly smaller than the inner diameter of said race track of the outer ring where it comes in contact with the needles.

6. A radial needle bearing according to claim 1, in which said seal ring comprise:
   a seal lip portion brought in contact with the outer surface of a shaft on which said radial needle bearing is mounted, said seal lip portion having at least one cutout formed in the inner edge of said seal lip portion so as to define an oil flow path of the lubricating oil flowing in the axial direction.

7. A radial needle bearing according to claim 6, in which said cutout is extended in an axial direction of said shaft.

8. A radial needle bearing according to claim 1, in which said seal ring comprise:
   a seal portion brought in contact with the outer surface of a shaft on which said radial needle bearing is mounted, said seal portion having at least one cutout so as to define an oil flow path of the lubricating oil flowing in the axial direction.

9. A radial needle bearing according to claim 8, in which said cutout is extended in an axial direction of said shaft.

10. A radial needle bearing according to claim 8, in which said cutout is extended in a radial direction of said shaft.

11. A radial needle bearing according to claim 1, in which said seal ring comprise:
    a seal portion brought in contact with the outer surface of a shaft on which said radial needle bearing is mounted, said seal ring has a slit so as to define an oil flow path of the lubricating oil flowing in the axial direction.

* * * * *